April 6, 1937.  W. J. GOLD  2,075,934
EMERGENCY APPLIANCE
Original Filed April 30, 1935  2 Sheets-Sheet 1
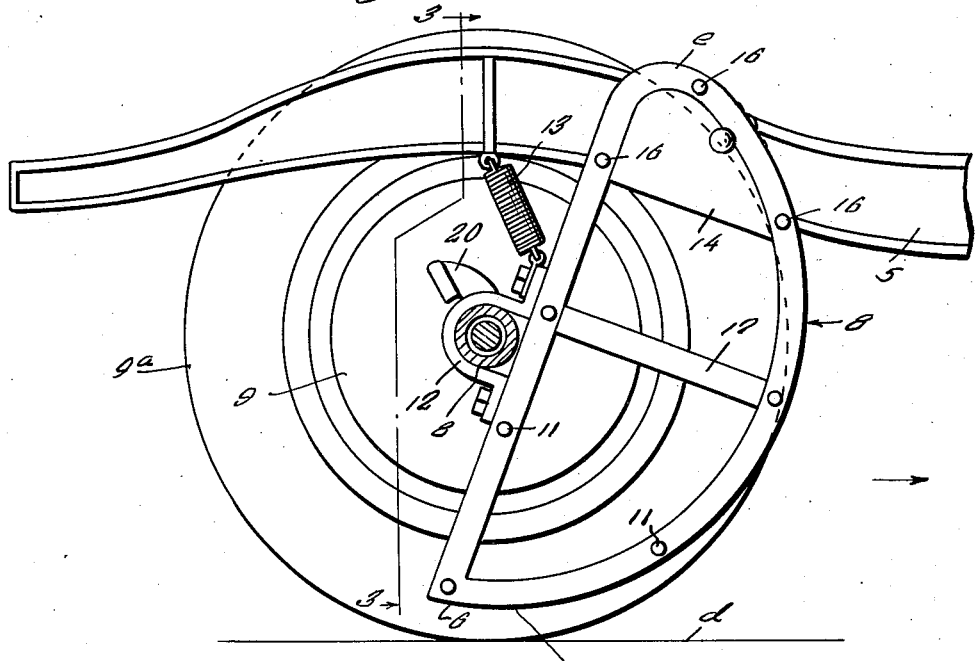
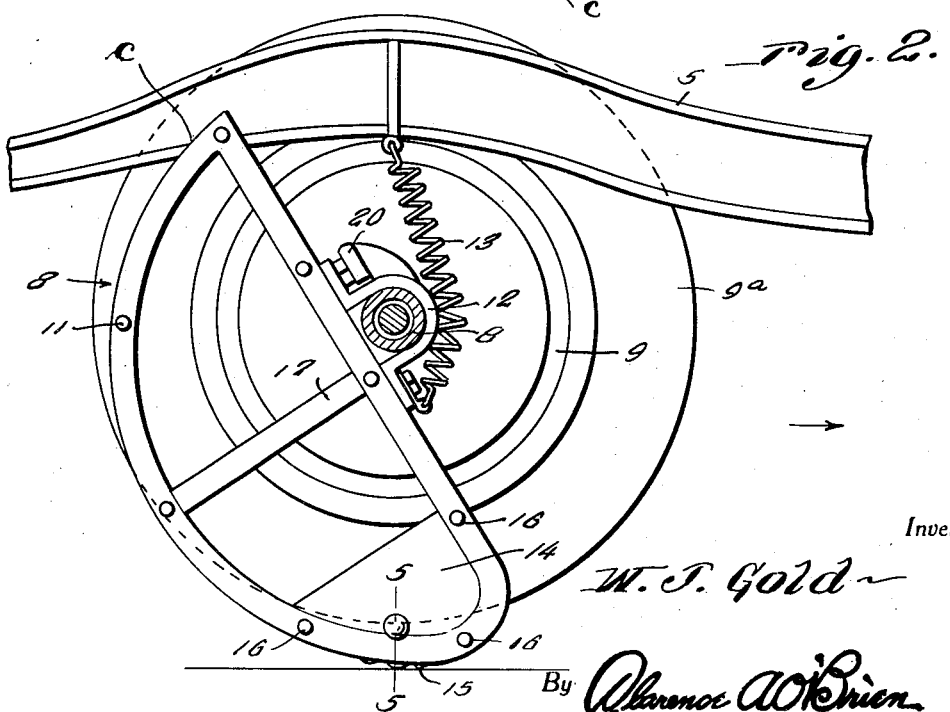
Inventor
W. J. Gold
By Clarence A. O'Brien
Attorney April 6, 1937. W. J. GOLD 2,075,934
EMERGENCY APPLIANCE
Original Filed April 30, 1935 2 Sheets-Sheet 2
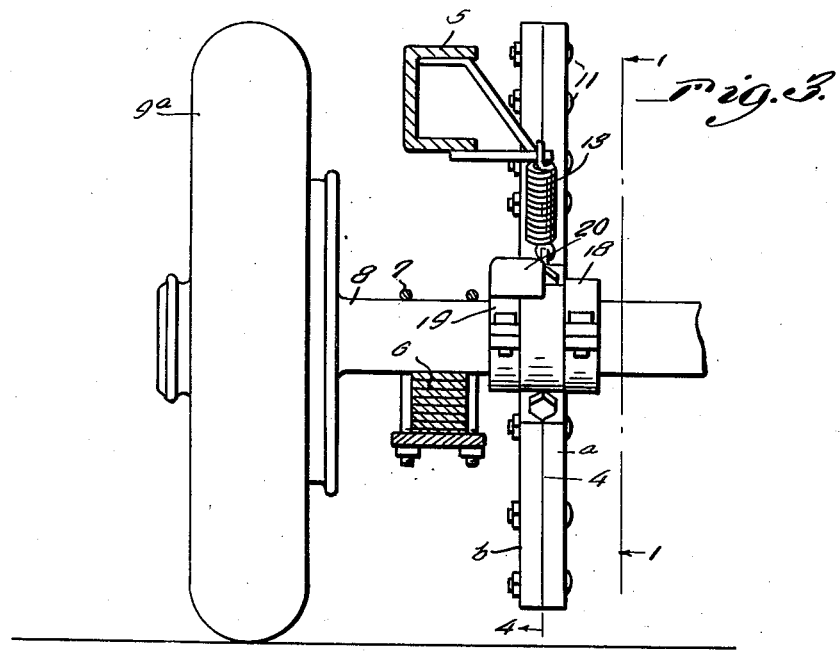
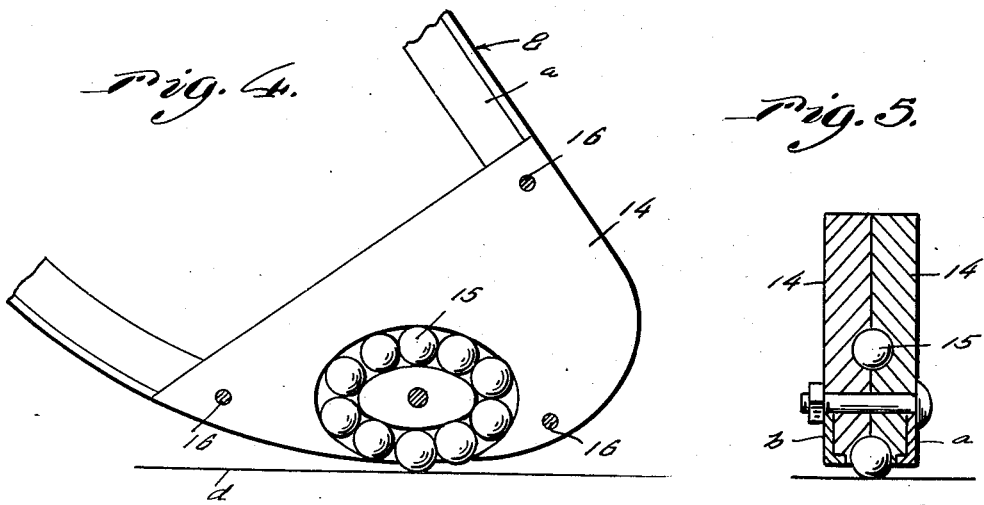
Inventor
W. J. Gold
By Clarence A. O'Brien
Attorney

UNITED STATES PATENT OFFICE 2,075,934

EMERGENCY APPLIANCE

William J. Gold, New York, N. Y.

Application April 30, 1935, Serial No. 19,109
Renewed November 5, 1936

3 Claims. (Cl. 280—150)

This invention appertains to new and useful improvements in emergency appliances for automobiles and like vehicles.

The principal object of the present invention is to provide an automatic jack for automobiles which will automatically engage the ground and lift the wheel, the tire of which has become deflated, so that the tire and tube therein will not be damaged through contact with the ground.

During the course of the following specification numerous important objects and advantages of the invention will become apparent to the reader.

In the drawings:

Figure 1 is a vertical sectional view taken substantially on line 1—1 of Figure 3, showing the appliance in inoperative position.

Figure 2 is a vertical sectional view taken substantially on the same line of Figure 3 as Figure 1, but showing the jack in operated position.

Figure 3 is a fragmentary detailed sectional view taken substantially on line 3—3 of Figure 1.

Figure 4 is a sectional view taken substantially on line 4—4 of Figure 3.

Figure 5 is a sectional view taken substantially on line 5—5 of Figure 2.

Referring to the drawings wherein like numerals designate like parts, it can be seen in Figure 3 that numeral 5 represents one side beam of the chassis while numeral 6 represents the usual semi-elliptical spring bolted as at 7 to the rear axle housing 8. (Or to the front axle if desired.) Numeral 9 represents the wheel with the tire 9a thereon. Numeral 8 generally refers to the improved jack which is entirely automatic in operation. This jack is of semi-circular frame construction. This semi-circular frame-like construction is made up of a pair of continuous angle iron members a—b with a pair of their flanges meeting its edge in the manner substantially shown in Figure 3. Bolts 11 are employed to secure these sections a—b together.

To the straight side of the jack is secured a U-member 12 so as to envelop the axle housing 8 so as to permit the jack to swing, but in an eccentric manner. In other words, this U-shaped member 12 is eccentrically disposed with respect to the center from which the arc of the curved side of the jack depends. So therefore, with the jack assuming the normal position shown in Figure 1, with a coiled extensible spring 13 serving to hold the jack in the elevated position disclosed, when the tire 9a becomes deflated to such an extent that the portion c engages the roadway d, the jack will be caused to rock until it reaches its opposite end e, at which point a pair of plates 14—14 are located. These plates 14—14 on their opposed sides are provided with ovate-shaped grooves, which when matched with the plates 14—14 together form a runway for ball bearings 15. Bolts 16 extend through these plates 14 and through the frame members a—b to hold these parts together. It will be observed in Figure 4 that the lower portion of the runway in which the ball bearings 15 are located is open at its bottom portion so that the ball bearings will be successively exposed to the roadway d. With the use of the ball bearings, obviously the jack will not interfere in any way with the steering of the vehicle in the event one or more of the tires are deflated.

A cross member 17 can be placed across the intermediate portion of the jack to strengthen the same and as is clearly shown in Figure 3, to fix the position of the jack on the axle housing 8 or on an axle, a pair of collars 18 and 19 are provided, one at each side of the U-shaped member 12. The collar 19 carries a stop 20 against which the jack can strike when in operative position as shown in Figure 2.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination with an automobile axle, a swingable rocker on the axle eccentrically connected thereto, and adapted to automatically engage the ground at one end when an adjacent wheel becomes deflated, and spring means for normally maintaining the rockable member in retracted position until a tire becomes deflated.

2. In combination with an automobile axle, a swingable rocker on the axle eccentrically connected thereto, and adapted to automatically engage the ground at one end when an adjacent wheel becomes deflated, and a ball bearing mount in the opposite end of the said rockable member.

3. An emergency attachment for wheeled vehicles comprising a ground engageable rocker, means for mounting the rocker on a vehicle in eccentric relation to a wheel thereof, a pair of plates secured against each other at one end of the rocker and each having an edge portion thereof forming a continuity of the ground engaging side of the rocker, the inner sides of the said plate being provided with grooveways registering with each other to form a runway, ball bearings in the runway, said runway opening through the aforementioned edges of the said plates.

WILLIAM J. GOLD.